(12) United States Patent
DiBenedetto

(10) Patent No.: US 7,967,560 B2
(45) Date of Patent: Jun. 28, 2011

(54) RADIALLY ENERGIZED OIL CAPTURE DEVICE FOR A GEARED TURBOFAN

(75) Inventor: Enzo DiBenedetto, Torrington, CT (US)

(73) Assignee: United Technologies Corporation, Hartford, CT (US)

( * ) Notice: Subject to any disclaimer, the term of this patent is extended or adjusted under 35 U.S.C. 154(b) by 662 days.

(21) Appl. No.: 11/593,731

(22) Filed: Nov. 7, 2006

(65) Prior Publication Data
US 2008/0107522 A1    May 8, 2008

(51) Int. Cl.
*F01D 5/08* (2006.01)
*F01D 5/18* (2006.01)
*F01D 11/00* (2006.01)
*F01D 25/00* (2006.01)
*F04D 29/00* (2006.01)

(52) U.S. Cl. .................. 415/175; 415/174.5; 415/230; 415/111; 60/39.08

(58) Field of Classification Search ............... 60/39.08; 415/174.5, 230, 111, 175
See application file for complete search history.

(56) References Cited

U.S. PATENT DOCUMENTS
6,330,790 B1 * 12/2001 Arora et al. .............. 60/39.08

FOREIGN PATENT DOCUMENTS
| EP | 1013895 | 6/2000 |
| EP | 1233147 | 8/2002 |
| WO | 0131235 | 5/2001 |

OTHER PUBLICATIONS

European Search Report mailed Apr. 21, 2009.

* cited by examiner

*Primary Examiner* — Michael Cuff
*Assistant Examiner* — Craig Kim
(74) *Attorney, Agent, or Firm* — Carlson, Gaskey & Olds PC

(57) ABSTRACT

A turbine engine utilizes an oil director to direct any leakage oil from a rear bearing compartment of the turbine engine toward a drain opening for an oil drain. The oil drain is formed in a heat shield located between the low pressure turbine and the exhaust nozzle. The oil drain directs the leakage oil to a benign area of the turbine engine.

19 Claims, 7 Drawing Sheets

RADIALLY ENERGIZED OIL CAPTURE DEVICE FOR A GEARED TURBOFAN

BACKGROUND OF THE INVENTION

The present invention relates generally to a rear bearing compartment for a turbine engine and more particularly, to an arrangement for capturing leakage oil from the rear bearing compartment.

Turbine engines utilize bearings for supporting rotor operation. Oil is contained in a bearing compartment. Bearing seals are used to contain the oil in the bearing compartments so the oil will not leak into hot areas of the turbine engine. Any oil leakage from the bearing compartments must be managed so the oil does not collect in areas within the turbine engine that may become a fire hazard.

Typically, secondary air pressurization and bearing compartment design are sufficient to prevent oil leakage from the bearing compartment. In addition to secondary air pressurization, front bearing compartments sometimes utilize oil drain systems, or "scupper systems", to capture and drain leakage oil to benign areas of the turbine engine. Scupper systems have not been utilized with rear bearing compartments due to space constraints within that part of the engine. However, as a result of the turbine engine design in some geared turbofan engines, sufficient secondary air pressurization cannot be obtained and additional management for leakage oil is required.

Accordingly, an arrangement to provide an oil drainage system for leakage oil from the rear bearing compartment is desired.

SUMMARY OF THE INVENTION

The present invention provides an oil drainage system for leakage oil from the rear bearing compartment of a turbine engine.

A turbine engine has a bearing seal located between a rear bearing compartment and an air compartment to seal oil within the rear bearing compartment and pressurized air in the air compartment. A plurality of knife edge seals are used to meter flow between the bearing compartment and the air compartment to reduce the possibility of leakage oil moving toward the air compartment. In addition, an oil director is located between first and second knife edge seals and directs any leakage oil toward an opening of an oil drain. The knife edges also provide sealing from the external environment so that some buffer pressurization air enters the scupper to assist in driving the oil to a benign area of the engine.

Leakage oil from the rear bearing compartment that has passed the first knife edge seal contacts the oil director. Rotation of the oil director with a turbine engine rotor directs the leakage oil toward an oil drain opening, which is located radially outwardly from the oil director. The oil drain is formed in a heat shield located between the low pressure turbine and the exhaust nozzle. The oil drain directs the leakage oil to a benign area of the turbine engine.

During operation of the engine the rotor and oil director may axially move relative to the oil drain and other static portions of the turbine engine. The oil drain opening is of sufficient width to be located radially outward from the oil director at both extremes of its movement. Thus, even when axial travel of the rotor moves the oil director, the oil drain opening is still positioned outward to ensure that leakage oil is directed into the oil drain.

These and other features of the present invention can be best understood from the following specification and drawings, the following of which is a brief description.

DETAILED DESCRIPTION OF THE PREFERRED EMBODIMENT

Figure 1:
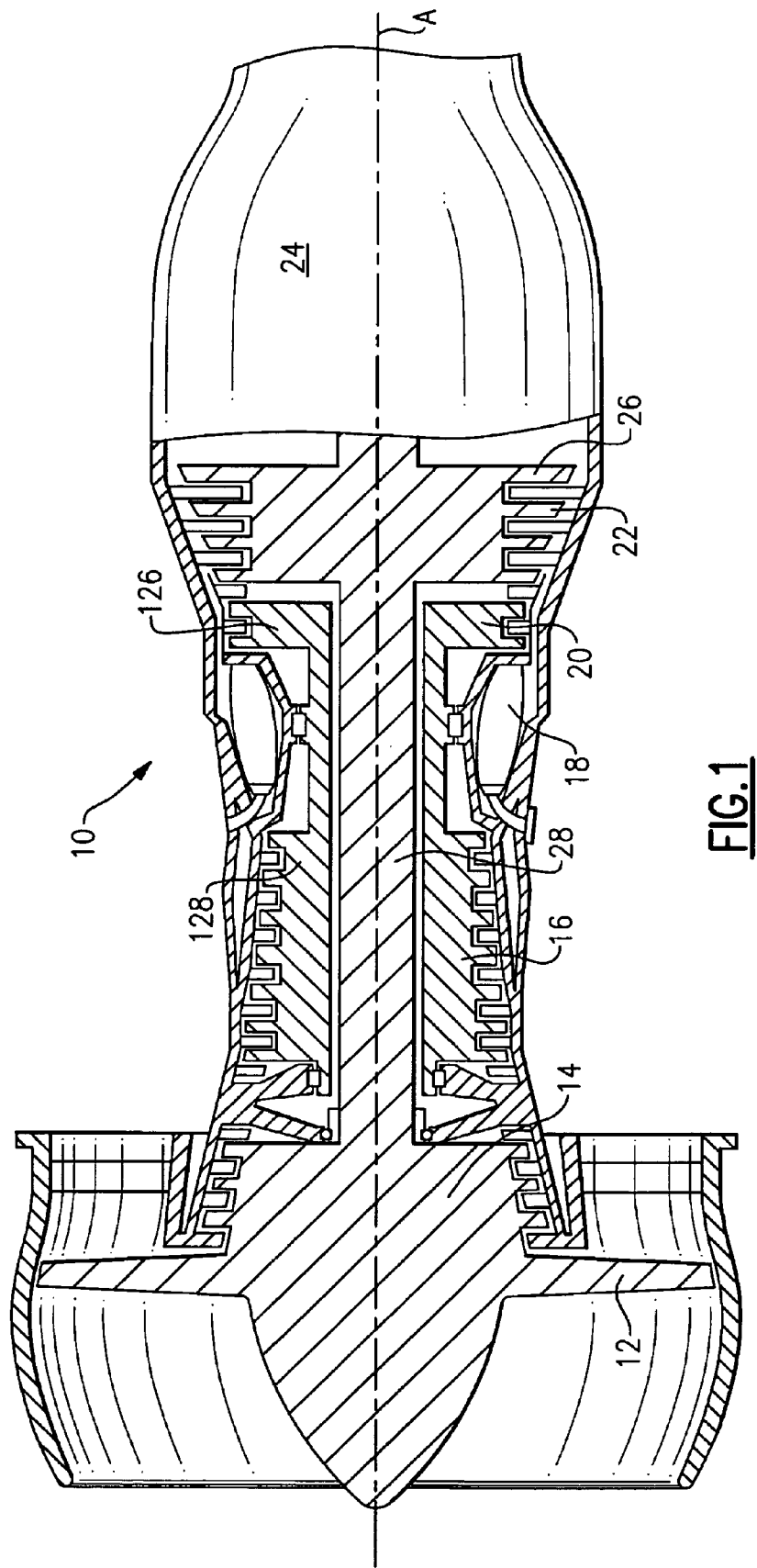
FIG. 1 is a schematic view of an example turbine engine of the present invention.

FIG. 1 is a schematic view of a gas turbine engine 10, such as a turbofan gas turbine engine. The engine 10 is circumferentially disposed about an engine centerline axis A. Air is pulled into the turbine engine 10 by a fan 12 and flows through a low pressure compressor 14 and a high pressure compressor 16. Air compressed in the compressors 14 and 16 is mixed with fuel which is burned in the combustion section 18 and expanded in a high pressure turbine 20 and a low pressure turbine 22 prior to leaving the engine 10 through an exhaust nozzle 24. The turbine 22 includes a rotor 26 which drives an engine shaft 28. A rotor 126 in turbine 20 drives a shaft 128 to in turn drive compressor 16. Rotation of the engine shaft 28 drives the fan 12 and compressor 14.

Figure 2:
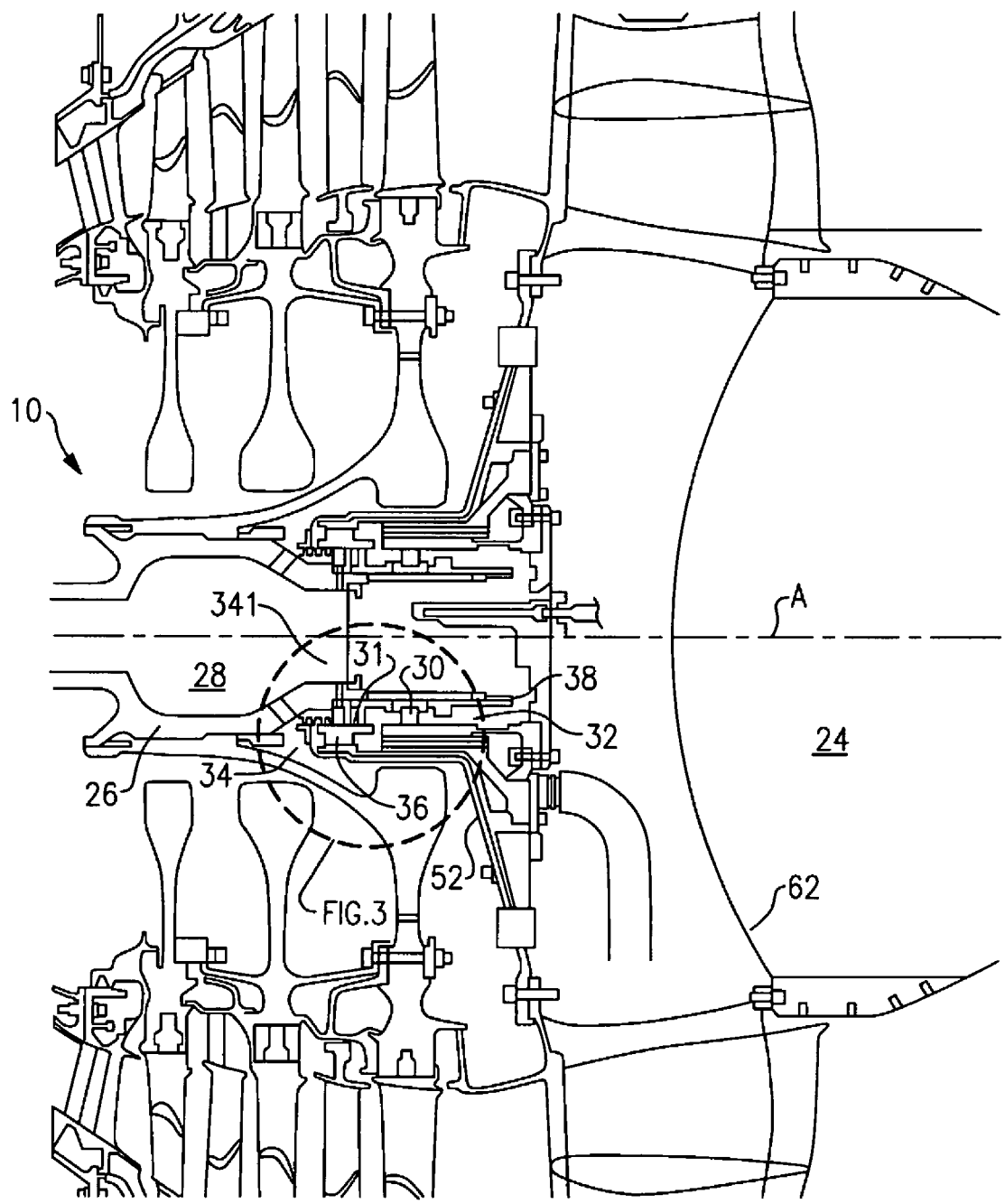
FIG. 2 is an enlarged view of a rear portion of the turbine engine.

FIG. 2 is a view of a portion of the rear of the turbine engine 10 with a bearing seal 31 located between a rear bearing compartment 32 and an air compartment 34. The bearing seal seat 311 is mounted to and rotates with the engine shaft 28. The bearing seal 31 contacts the turbine engine housing 36 and seal seat 311 to create a seal between the rear bearing compartment 32 and the air compartment 34. The turbine engine housing 36 is static and the bearing seal seat 311 rotates relative to the housing 36. Oil 38 is contained within the rear bearing compartment 32 and pressurized air is located in the air compartment 34 and 341.

Figure 3:
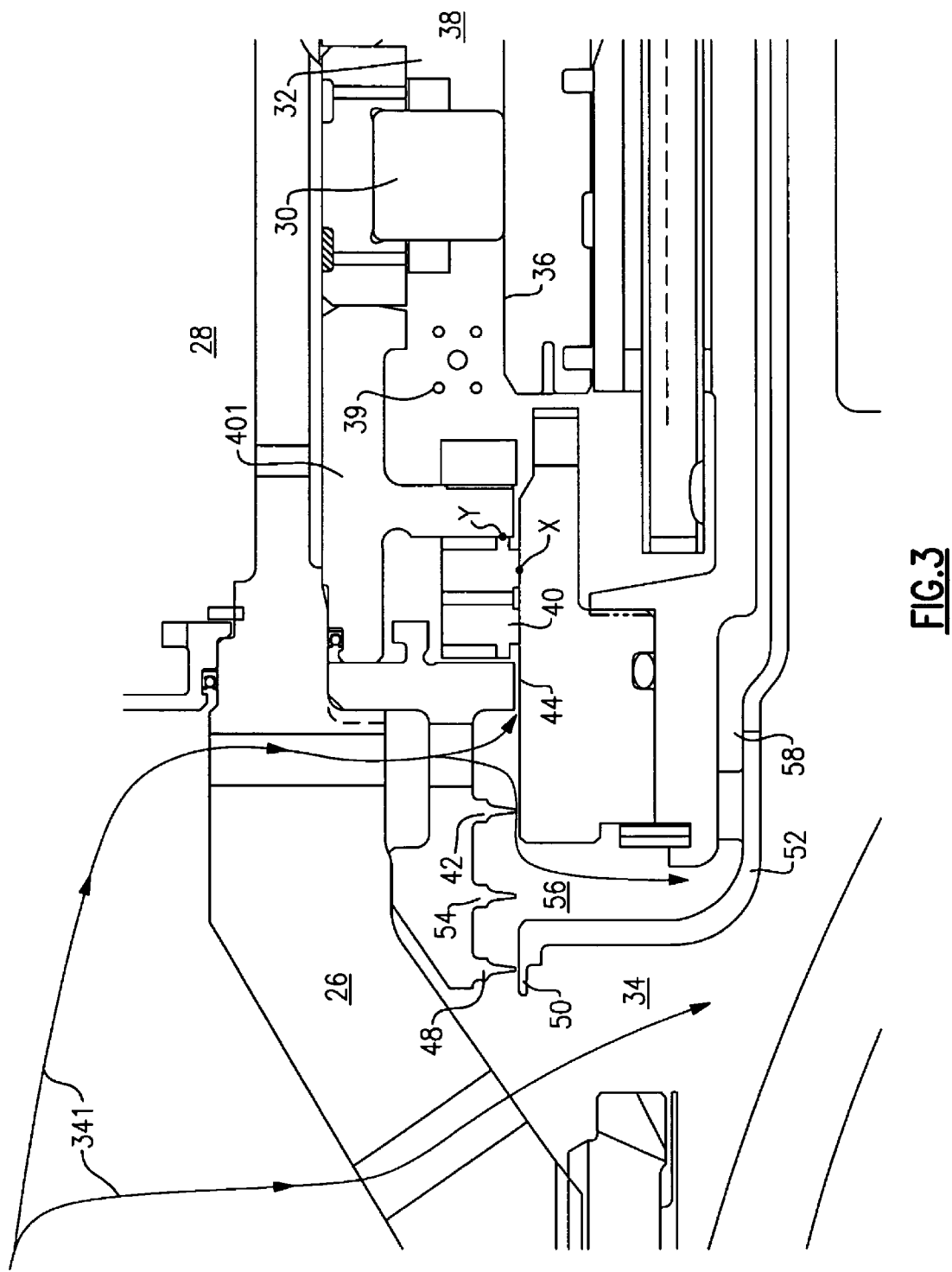
FIG. 3 in enlarged view of Section 3 from FIG. 2 also showing buffer air direction.

FIG. 3 is an enlarged view of Section 3 of FIG. 2. A carbon seal 40 is located axially between the bearing 30 and the air compartment 34 to retain any leakage oil 39 from the bearing compartment 32. The carbon seal 40 has an annular shape and is mounted about the engine shaft 28. The carbon seal 40 seals with the rotating spacer 401 and contacts a static liner housing 44 of the turbine engine 10. Seal 40 is static and seal points x and y are formed. The arrows show the direction of buffer air flow.

A plurality of knife edge seals are used to meter flow between the bearing compartment 32 and the air compartment 34. A first knife edge seal 42 extends radially outward from the circumference of the rotor 26 toward the static liner housing 44 and rotates with the rotor 26. The first knife edge seal 42 does not contact the liner housing 44, but extends close enough to limit flow from the air compartment 34 side of the first knife edge seal 42 to the bearing compartment 32 side of the first knife edge seal 42. A pressure differential is created across the first knife edge seal 42 from the air source 341 to maintain air pressure within the air compartment 34. Air on the air compartment 341 side of the first knife edge seal 42 is maintained at a higher pressure then air on the bearing compartment 32 side of the first knife edge seal 42. Due to the pressure differential across the first knife edge seal 42 air flow moves toward the bearing compartment 32 and reduces the possibility of leakage oil 39 moving toward the air compartment 34.

A second knife edge seal 48 is axially spaced from the first knife edge seal 42. The second knife edge seal 48 extends radially outward from the circumference of the rotor 26 toward a seal land 50 on a heat shield 52 of the turbine engine 10. The second knife edge seal 48 rotates with the rotor 26 while the seal land 50 and heat shield 52 remain stationary. The second knife edge seal 48 does not contact the seal land 50, but extends close enough to meter flow from the air compartment 34 side of the second knife edge seal 48 to the opening 56 of the second knife edge seal 48, or vise versa. A pressure differential is created across the second knife edge seal 48 to maintain air pressure between the air compartment 34 and opening 56. The second knife edge seal 48 is the second barrier to resist leakage oil 39 from entering the air compartment 34, should it bypass the opening 56.

In addition to the first knife edge seal 42 and the second knife edge seal 48, an oil director 54 extends radially outward from the rotor 26 and directs the oil away from the air compartment 34. The oil director 54 is axially located between the first knife edge seal 42 and the second knife edge seal 48. In the embodiment shown, the oil director 54 is shaped like the knife edge seals. An opening 56 for an oil drain 58 is located radially outward from the oil director 54.

Figure 4:
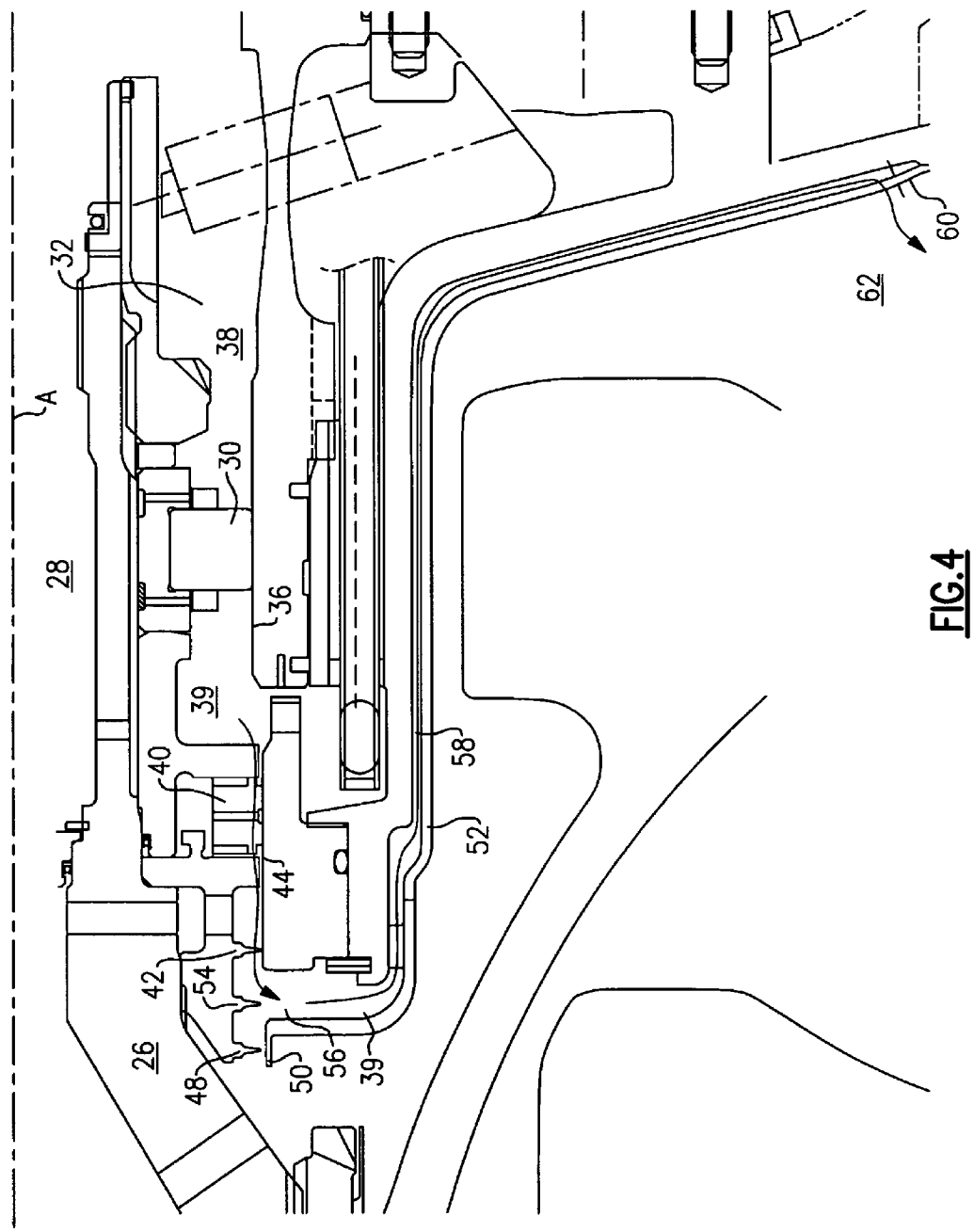
FIG. 4 illustrates an example leakage oil flow path into the scupper and routed to a benign area of the engine.

FIG. 4 illustrates an example leakage oil flow path. Leakage oil 39 from the bearing compartment 32 that has passed the carbon seal 40 and the first knife edge seal 42 contacts the oil director 54. Rotation of the oil director 54 with the rotor 26 directs the leakage oil 39 toward the oil drain opening 56. The oil drain 58 is integrally formed in a heat shield 52 located between the low pressure turbine 22 and the exhaust nozzle 24. The oil drain 58 along with the heat shield 52 extends circumferentially about the engine axis A. The oil drain 58 directs the leakage oil 39 to a drain hole 60 located at bottom dead center of the turbine engine 10. The drain hole 60 allows the leakage oil 39 to enter the gas flow path within the turbine exhaust case 62. Thus, the leakage oil 39 is combusted with engine fuel spent from the turbine engine 10. Alternately, the oil drain 58 can lead to any benign area of the turbine engine 10 where the leakage oil 39 can be stored or disposed of, as desired.

Figure 5A:
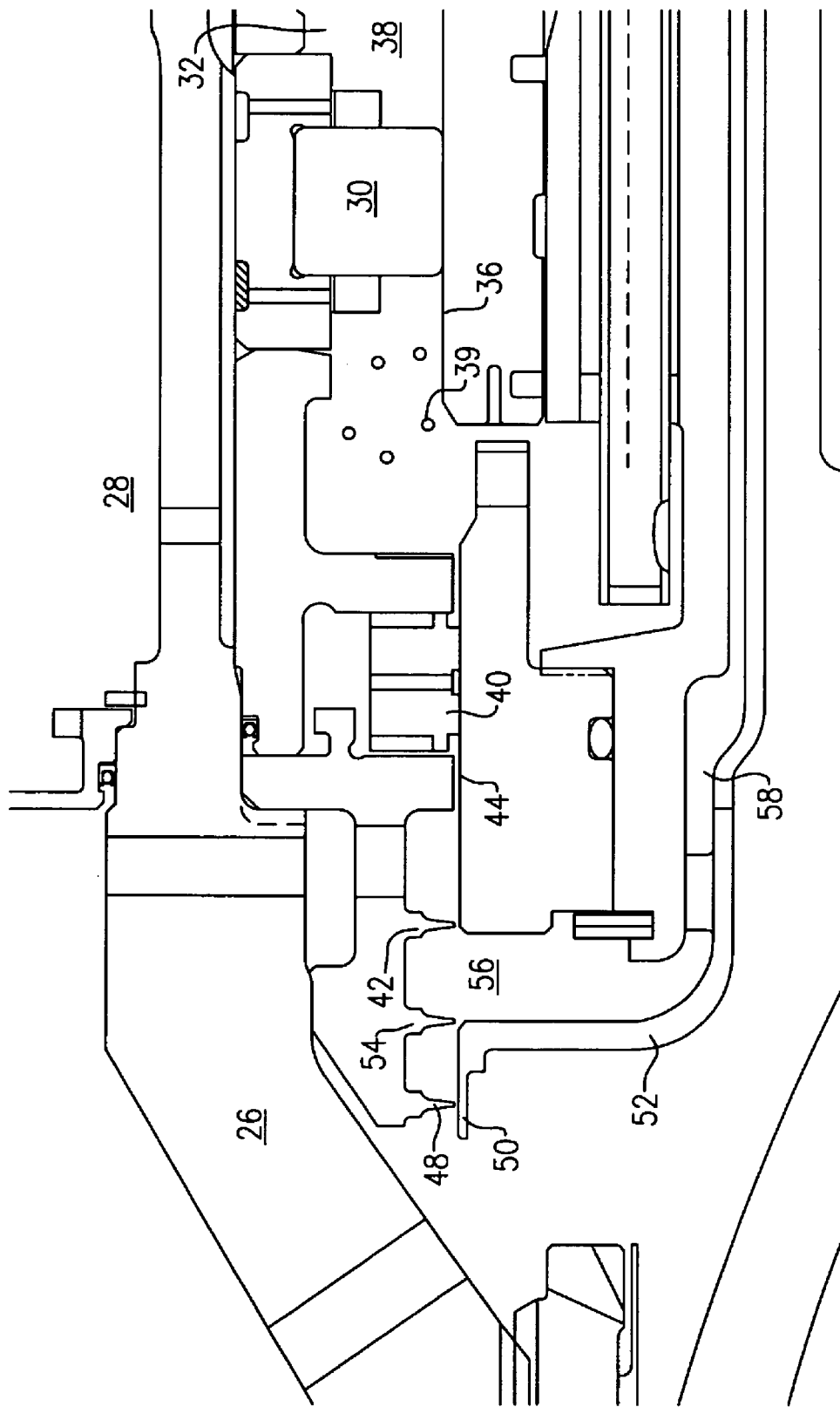
FIG. 5a illustrates the full forward position of the example oil drainage system as a result of axial movement of the rotor.
Figure 5B:
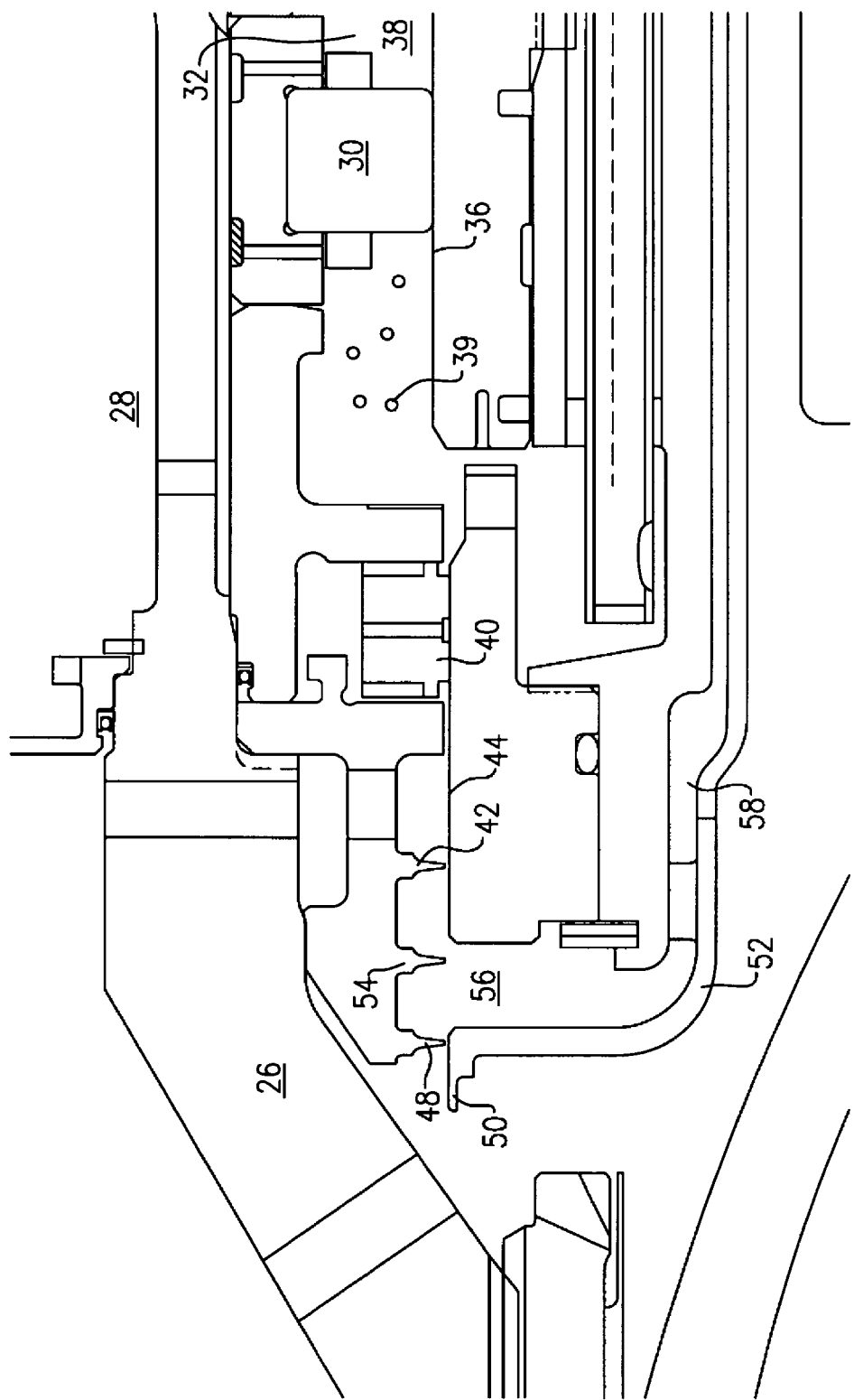
FIG. 5b illustrates the full aft position of the example oil drainage system as a result of axial movement of the rotor.

During operation of the engine 10 the engine shaft 28 and rotor 26 may axially move relative to the static portions of the turbine engine 10. FIGS. 5a and 5b illustrate the full forward and full aft positions, respectively, of the first knife edge seal 42, oil director 54, and second knife edge seal 48 as a result of axial movement of the rotor 26. The first knife edge seal 42 extends radially outward toward the static housing 36 when in the full forward position and in the full aft position. The first knife edge seal 42 is radially inward of the static housing 36 at all locations of axial movement of the rotor 26. Thus, the first knife edge seal 42 is always in a position to meter flow.

The second knife edge seal 48 extends radially outward toward the seal land 50 when in the full forward position and the full aft position. The seal land 50 is wide enough that the second knife edge seal 48 is radially inward of the seal land 50 at all locations of axial movement of the rotor 26. Thus, the second knife edge seal 48 is always in a position to meter flow.

The drain opening 56 is located radially outward from the oil director 54 whether the oil director 54 is in the full forward position or the full aft position. Thus, even if axial travel of the rotor 26 moves the first knife edge seal 42 and second knife edge seal 48 relative to the static components flow metering is maintained. Also, the drain opening 56 is always located outward of the oil director 54 to ensure that leakage oil 39 is directed into the oil drain 58.

Figure 6:
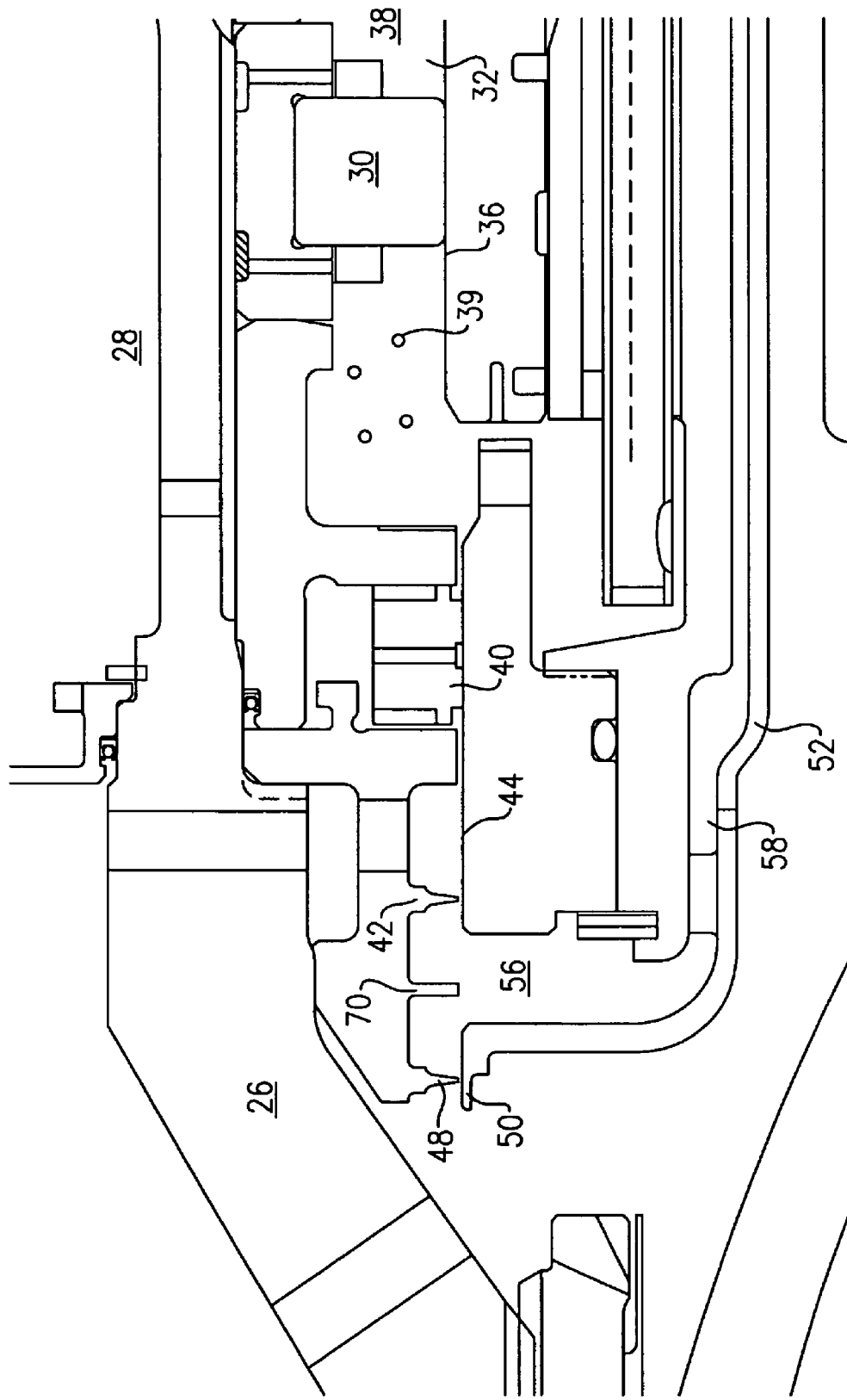
FIG. 6 is an enlarged view of an alternate embodiment of an oil director.

FIG. 6 is an enlarged view of an alternate oil director 70. The oil director 70 extends radially outward from the rotor 26 and is located axially between the first knife edge seal 42 and the second knife edge seal 44. The oil director 70 is a plurality of impeller shaped protrusions to direct the leakage oil toward the oil drain 58. The oil director 70 may also take other shapes and/or include features to assist in directing the leakage oil toward the oil drain 58.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A turbine engine comprising:
   a compressor;
   a combustor;
   a turbine, said turbine driving a shaft; and
   a bearing supporting the shaft mounted in a bearing compartment, a bearing seal located between the bearing compartment and an air compartment, an oil drain having an edge, a pair of knife edge seals located between the air compartment and the bearing seal, each of said knife edge seals being disposed in close proximity to said edge of said oil drain to meter flow between the bearing and the air compartment, and an oil director located between said pair of knife edge seals to direct a flow of leakage oil toward said oil drain wherein said oil drain is spaced radially outwardly in line therewith from said oil director, wherein said oil director does not extend into an opening of said oil drain so that said oil director may move axially without damaging said oil director.

2. The turbine engine of claim 1, wherein the oil director has a shape similar to the knife edge seals.

3. The turbine engine of claim 1, wherein the oil director is an impeller shaped protrusion.

4. The turbine engine of claim 1, wherein the oil drain is formed in a heat shield of the turbine engine.

5. The turbine engine of claim 1, wherein the oil drain is connected to the turbine exhaust case to direct the oil within the oil drain to a gas path of the turbine engine.

6. The turbine engine of claim 1, wherein the oil drain is spaced radially outward from the oil director.

7. The turbine engine of claim 1, wherein oil director is movable relative to the oil drain between two positions and the oil director is aligned with a drain opening for the oil drain in both positions.

8. The turbine engine of claim 1, wherein a first knife edge extends toward a turbine engine housing and a second knife edge extends toward a heat shield of the turbine engine.

9. The turbine engine of claim 8, wherein there is a clearance between the first knife edge and the turbine engine housing.

10. The turbine engine of claim 1 wherein said oil director has a same radial length as said knife edge seals and does not extend into said drain.

11. An oil system for a turbine engine comprising:
a bearing seal located between a bearing compartment and an air compartment, wherein the rear bearing compartment is intended to contain oil;
a plurality of seals between the air compartment and the bearing seal to meter flow between the bearing seal and the air compartment; and
an oil director located between any two of said plurality of seals to direct a flow of leakage oil from the rear bearing compartment toward an oil drain, wherein said oil director is axially movable between two positions, and a drain opening for said oil drain can receive oil from said oil director in both positions wherein said oil drain is spaced radially outward from said oil director and in line therewith and does not extend into said oil drain so that said oil director may move axially without damaging said oil director.

12. The oil system of claim 11, wherein the first and second seals are knife edge seals.

13. The oil system of claim 12, wherein the oil director has a shape similar to the knife edge seals.

14. The oil system of claim 11, wherein the oil director is an impeller shaped protrusion.

15. The oil system of claim 11, wherein the oil drain is formed in the heat shield.

16. The oil system of claim 15, wherein the oil drain is connected to the turbine exhaust case to direct the oil within the oil drain to a gas path of the turbine engine.

17. The oil system of claim 11 wherein said oil director has a same axial length as said seals.

18. The oil system of claim 11 further comprising said oil seal having an edge and wherein said plurality of seals comprises a pair of seals located between the air compartment and the bearing seal, each of said seals being disposed in close proximity to said edge of said oil drain to meter flow between the bearing and the air compartment, and an oil director located between said pair of seals to direct a flow of leakage oil toward said oil drain.

19. The oil system of claim 11 wherein the plurality of seals includes a first seal extending toward a turbine engine housing and a second seal extending toward a heat shield of the turbine engine.

* * * * *